(12) United States Patent
Sambhy et al.

(10) Patent No.: US 9,857,710 B1
(45) Date of Patent: Jan. 2, 2018

(54) SUPPORT MATERIAL COMPRISING POLYVINYLALCOHOL AND ITS USE IN XEROGRAPHIC ADDITIVE MANUFACTURING

(71) Applicant: XEROX CORPORATION, Norwalk, CT (US)

(72) Inventors: Varun Sambhy, Pittsford, NY (US); John S. Facci, Webster, NY (US); Eliud Robles-Flores, Rochester, NY (US); David S. Derleth, Webster, NY (US); David C. Craig, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/258,190

(22) Filed: Sep. 7, 2016

(51) Int. Cl.
*G03G 9/087* (2006.01)
*B33Y 70/00* (2015.01)
*G03G 9/08* (2006.01)

(52) U.S. Cl.
CPC .......... *G03G 9/08775* (2013.01); *B33Y 70/00* (2014.12); *G03G 9/081* (2013.01); *G03G 9/0874* (2013.01); *G03G 9/08708* (2013.01); *G03G 9/08722* (2013.01); *G03G 9/08731* (2013.01); *G03G 9/08737* (2013.01); *G03G 9/08766* (2013.01)

(58) Field of Classification Search
CPC ............. G03G 9/08722; G03G 9/0874; G03G 9/08775; G03G 9/08766; G03G 9/08737; G03G 9/08708; G03G 9/08731; G03G 9/0821; G03G 9/081
See application file for complete search history.

(56) References Cited

U.S. PATENT DOCUMENTS

| | | | |
|---|---|---|---|
| 5,556,727 A | 9/1996 | Ciccarelli et al. | |
| 6,004,714 A | 12/1999 | Ciccarelli et al. | |
| 8,460,451 B2 | 6/2013 | Xu et al. | |
| 8,798,512 B2 * | 8/2014 | Okamoto | D06P 1/0004 399/310 |
| 9,023,566 B2 * | 5/2015 | Martin | G03G 9/08791 430/108.22 |
| 2004/0137352 A1 | 7/2004 | McStravick et al. | |

* cited by examiner

*Primary Examiner* — Janis L Dote
(74) *Attorney, Agent, or Firm* — Pillsbury Winthrop Shaw Pittman LLP

(57) ABSTRACT

A support material toner particle for use in xerographic additive manufacturing includes a polyvinyl alcohol (PVA) polymer and blend-additives including a chitosan and a polyvinylpyrrolidone (PVP), the amount of blend-additives is selected to adjust the $T_g$ of the PVA polymer to be within about 1° C. to about 20° C. of a desired build material toner $T_g$. A xerographic toner system includes a build toner material and a support toner material, the support toner material includes a polyvinyl alcohol (PVA) polymer and blend-additives including a chitosan and a polyvinylpyrrolidone (PVP), the amount of blend-additives is selected to adjust the $T_g$ of the PVA polymer to be within about 1° C. to about 20° C. of the build material toner $T_g$. A method of making a support toner material includes blending polyvinyl alcohol with blend additives including a chitosan and polyvinylpyrrolidone and forming support toner particles after the blending step.

19 Claims, 1 Drawing Sheet

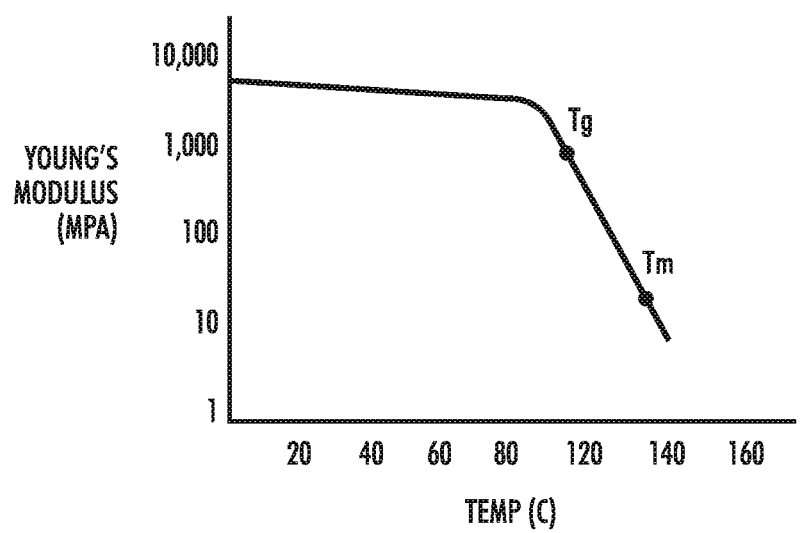

SUPPORT MATERIAL COMPRISING POLYVINYLALCOHOL AND ITS USE IN XEROGRAPHIC ADDITIVE MANUFACTURING

BACKGROUND

The present disclosure relates to additive manufacturing. In particular, the present disclosure relates to support materials that can be used in additive manufacturing via xerographic printing.

Additive manufacturing, also referred to commonly as 3D printing, employs various build materials to assemble a printed object. When assembling objects with complex shapes, the process frequently uses an additional support material. The function of the support material is to provide a platform upon which to build 3-dimensional features such as overhangs that are required by virtue of assembling an object from the bottom up. The support material is sacrificial and generally removed via melting or by a solvent wash, thus serving its role as a temporary support when making complex three-dimensional objects. Suitable support materials are well known in the art. See for example, U.S. Pat. No. 8,460,451 which is incorporated herein by reference in its entirety. What remains to be further developed are support materials that can operate in the context of additive manufacturing via xerographic techniques. The present disclosure provides such materials and other advantages.

SUMMARY

In some aspects, embodiments herein relate to support material toner particles for use in xerographic additive manufacturing comprising a polyvinyl alcohol (PVA) polymer and blend-additives comprising a chitosan and a polyvinylpyrrolidone (PVP), wherein the amount of blend-additives is selected to adjust the $T_g$ of the PVA polymer to be within about 1° C. to about 20° C. of a desired build toner material $T_g$. For purposes of describing the present embodiments, the terms "support material toner" and "support toner material" will be used interchangeably and the terms "build material toner" and "build toner material" will be used interchangeably.

In some aspects, embodiments herein relate to xerographic toner systems comprising a build toner material and a support toner material, the support toner material comprising a polyvinyl alcohol (PVA) polymer and blend-additives comprising a chitosan and a polyvinylpyrrolidone (PVP), wherein the amount of blend-additives is selected to adjust the $T_g$ of the PVA polymer to be within about 1° C. to about 20° C. of the build toner material $T_g$.

In some aspects, embodiments herein relate to methods of making a support toner material comprising blending polyvinyl alcohol with blend additives comprising a chitosan and polyvinylpyrrolidone and forming support toner particles after the blending step.

BRIEF DESCRIPTION OF DRAWINGS

Various embodiments of the present disclosure will be described herein below with reference to the FIGURE wherein:

The FIGURE shows a graph indicating the idealized melt rheology curve for a hypothetical toner resin, in accordance with embodiments herein.

DETAILED DESCRIPTION

Production of three-dimensional articles using a xerographic process is predicated on the deposition of a build material, from which the article itself is produced, and a support material, which fill voids and cavities in the article. The article is built up by a layer-upon-layer from the bottom-up. In the xerographic context the build and/or support material are typically transferred to a conveyor, such as a belt or drum and then the materials can be optionally pre-heated and then transfused on a build platform. The function of the support material is to provide mechanical support to the build material during the manufacture (print).

The support material is designed to be easily removed (e.g., by dissolving in solvent or melted depending on the nature of the build/support materials employed) after the "print" to leave behind the completed article. However, in a xerographic additive manufacturing process using layer by layer transfuse of the build and support material, the build and support materials ideally have very similar thermal and melt rheological properties e.g., glass transition temperature $T_g$. In addition, the support material is beneficially designed to be cheap, non toxic and easily removable. In embodiments, removal may be achieved by dissolving the support material in water, for example.

To these ends, embodiments herein provide polyvinyl alcohol (PVA)-based polymer blends as resins for the manufacture of toners for use in xerographic based additive manufacturing (3D printing) systems. Advantageously, PVA-based support materials may be readily removable with water. One functional property demand on the support material is that it has a similar melt rheology as the build material for a robust transfuse step. The melt rheology that is desirable to target can be understood with reference to The FIGURE.

In the initial heating of a developed layer on the intermediate transfer belt (or drum) and the heating of the already formed layers on the platen to the tacky state the toner resin is heated slightly above its $T_g$ while remaining well below its melting point ($T_m$) so that the integrity of the layers on the platen is maintained during transfuse and the integrity of the transferring layer is also maintained. During the post transfer step a temperature closer to $T_m$ is used to fuse the uppermost layer to the layers below. However, for the support layer, it may be beneficial to have higher $T_m$ than build material so that the support layers do not fuse together and can be removed easily. Thus, given a particular pre-transfer temperature it is desirable that both the support and build materials have a similar state of tackiness and have similar $T_g$. The PVA-based support materials disclosed herein are designed to have a tunable $T_g$ to match that of the build material but have much higher $T_m$ (~300° C.) to enable easy removal by dissolving in post build step.

Polyvinyl alcohol (PVA) is a very cheap and food grade water soluble polymer. It is a thermoplastic and grades are commercially available that can be melt extruded into parts and sheets (e.g., MOWIFLEX™). PVA filaments are already being used and available as cold water soluble support materials in additive manufacturing. However, the $T_g$ of PVA is low at about 75 to about 85° C. depending on grade. Most common build materials with good mechanical properties have higher $T_g$ e.g., acrylonitrile butadiene styrene (ABS) has $T_g$ of about 100 to about 130° C. and Nylon polyesters have $T_g$ of about 80 to about 110° C. Hence it is desirable to increase and match $T_g$ of PVA to common build materials to enable its use as a robust transfusable support material in xerographic 3D printing. As disclosed herein there are provided PVA-based toner formulation having tunable $T_g$ to match a particular build material.

Embodiments herein provide PVA-based toners as blends with additives that increase its $T_g$ to approximate that of a target build material's $T_g$. Without being bound by theory, it is posulated that the additives disclosed herein increase hydrogen bonding and may serve as a cross-link between PVA chains to increase the PVA blend's $T_g$. By tuning the weight % of additive, it is possible to tune the $T_g$ of the PVA blend to specifications required to match the build material $T_g$. In one exemplary embodiment, PVA may be blended with polyvinylpyrrolidone (PVP) and chitosan to create blends that having tunable $T_g$ from about 90° C. to about 112° C. based on blend formulation. Polyvinylpyrrolidone is an inexpensive, food grade, water soluble polymer. Chitosan is a linear polysaccharide obtained from crustacean shells; it is also inexpensive and can be obtained in food grade.

In embodiments, there are provided support material toners for use in xerographic additive manufacturing comprising a polyvinyl alcohol (PVA) polymer and blend-additives comprising a chitosan and a polyvinylpyrrolidone (PVP), wherein the amount of blend-additives is selected to adjust the $T_g$ of the PVA polymer to be within about 1° C. to about 20° C. of a desired build material toner $T_g$, or within about 1° C. to about 10° C., or within about 1° C. to about 5° C.

In embodiments, the weight percent of PVA in the PVA/PVP/Chitosan blend is in a range from about 30% to about 99%. In embodiments, the weight percent of PVP in the PVA/PVP/Chitosan blend is in a range from about 30% to about 99%.

In embodiments, the weight percent of chitosan in the PVA/PVP/Chitosan blend is in a range from about 0.1° A to about 15%.

In embodiments, the PVA/PVP/Chitosan blend-additives are present in an amount from about 70 percent by weight of the toner to about 99 percent by weight of the support material toner.

In embodiments, the support material toner may further comprise toner surface additives. In embodiments, the toner surface additives comprise one or more of a silica, a titania, a silicone oil, a charge control agent.

In embodiments, the blend-additives may further comprise a wax. Suitable waxes for include, but are not limited to, alkylene waxes such as alkylene wax having about 1 to about 25 carbon atoms, polyethylene, polypropylene, polymethylene, Fisher-Tropsch waxes, ester waxes or mixtures thereof. The wax may be present, for example, in a non-zero amount up to about 6%, or up to about 10%, or up to about 15% by weight based upon the total weight of the composition. Examples of waxes include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes possess, it is believed, a molecular weight (Mw) of about 1,000 to about 5,000, and the commercially available polypropylenes are believed to possess a molecular weight of about 4,000 to about 10,000. Examples of functionalized waxes include amines, amides, for example Aqua SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 41™, AQUA POLYSILK 19™, POLYSILK 14™ available from Micro Powder Inc., mixed fluorinated, amide waxes, for example Microspersion 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and SC Johnson Wax.

In some embodiments, the wax comprises a wax in the form of a dispersion comprising, for example, a wax having a particle diameter of about 100 nanometers to about 500 nanometers, water, and an anionic surfactant. In embodiments, the wax is included in amounts such as about 6 to about 15 weight percent. In embodiments, the wax comprises polyethylene wax particles, such as POLYWAX™ 850, commercially available from Baker Petrolite, although not limited thereto, having a particle diameter in the range of about 100 to about 500 nanometers, although not limited. The surfactant used to disperse the wax is an anionic surfactant, although not limited thereto, such as, for example, NEOGEN RK™ commercially available from Kao Corporation or TAYCAPOWER BN2060 commercially available from Tayca Corporation.

In embodiments, the blend additives further comprise a colorant. Various suitable colorants of any color can be present in the toners, including suitable colored pigments, dyes, and mixtures thereof including REGAL 330®; (Cabot), Acetylene Black, Lamp Black, Aniline Black; magnetites, such as Mobay magnetites M08029®, M08060®; Columbian magnetites; MAPICO® BLACKS and surface treated magnetites; Pfizer magnetites CB4799®, CB5300®, CB5600®, MCX6369®; Bayer magnetites, BAYFERROX 8600®, 8610®; Northern Pigments magnetites, NP-604®, NP 608®; Magnox magnetites TMB-100®, or TMB-104®; and the like; cyan, magenta, yellow, red, green, brown, blue or mixtures thereof, such as specific phthalocyanine HELIOGEN BLUE L6900®, D6840®, D7080®, D7020®, PYLAM OIL BLUE®, PYLAM OIL YELLOW®, PIGMENT BLUE 1® available from Paul Uhlich & Company, Inc., PIGMENT VIOLET 1®, PIGMENT RED 48®, LEMON CHROME YELLOW DCC 1026®, E.D. TOLUIDINE RED® and BON RED C® available from Dominion Color Corporation, Ltd., Toronto, Ontario, NOVAPERM YELLOW FGL®, HOSTAPERM PINK E® from Hoechst, and CINQUASIA MAGENTA® available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include copper tetra(octadecyl sulfonamido) phthalocyanine, x copper phthalocyanine pigment listed in the Color Index as CI 74160, CI Pigment Blue, and Anthrathrene Blue, identified in the Color Index as CI 69810, Special Blue X 2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5 dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant may be black, cyan, magenta and/or yellow colorant, may be incorporated in an amount sufficient to impart the desired color to the support inks. In general, pigment or dye is selected, for example, in a non-zero amount up to about 2% by weight, or up to about 6% by weight, or up to about 10% by weight.

In embodiments, the chitosan has a number average molecular weight from about 100,000 Daltons to about 1,000,000 Daltons, or about 300,000 Daltons to about 800,000 Daltons, or about 500,000 Daltons to about 700,000 Daltons. In embodiments, the PVP has a number average molecular weight from about 1,000 Daltons to about 500,000 Daltons, or about 100,000 Daltons to about 400,000 Daltons, or about 200,000 Daltons to about 300,000 Daltons. In embodiments, the PVA has a number average molecular weight from about 10,000 Daltons to about 1,500,000 Daltons, or about 500,000 Daltons to about 1,000,000 Daltons, or about 600,000 Daltons to about 800,000 Daltons.

In embodiments, there are provided xerographic toner systems comprising a build toner material and a support toner material, wherein the support toner material comprises a polyvinyl alcohol (PVA) polymer and blend-additives comprising a chitosan, and a polyvinylpyrrolidone (PVP), wherein the amount of blend-additives is selected to adjust the $T_g$ of the PVA polymer to be within about 1° C. to about 20° C. of the build material toner $T_g$, or within about 1° C. to about 10° C., or within about 1° C. to about 5° C.

In embodiments, the build material comprises acrylonitrile butadiene styrene (ABS).

In embodiments, the ABS has a $T_g$ of about 100 to about 130° C.

In embodiments, the build material comprises a nylon polyester. In embodiments, the nylon polyester may have a $T_g$ of about 80° C. to about 110° C.

In embodiments, the support material toner further comprises surface additives.

In embodiments, the surface additives comprise one or more of a silica, a titania, a silicone oil, a charge control agent. In embodiments, the blend additives further comprise a colorant.

The toner compositions disclosed herein include externally applied additives which include the barium titanate, cerium dioxide, or silicon carbide. In some embodiments, the additives may further comprise at least one of surface-treated silica, surface-treated titania, spacer particles, and combinations thereof. The additives may be packaged together as an additives package to add to the toner composition. That is, the toner particles are first formed, followed by mixing of the toner particles with the materials of the additives package. The result is that some components of the additive package may coat or adhere to external surfaces of the toner particles, rather than being incorporated into the bulk of the toner particles. The uncoated barium titanate, however, is not specifically designed to adhere to the toner particles per se as they ideally are free flowing to provide the requisite BCR contamination prevention, in accordance with embodiments disclosed herein.

Silica

Any suitable silica or surface treated silica can be used, and many varieties are known and available in the art. Such silicas can be used alone, as only one silica, or can be used in combination, such as two or more silicas. Where two or more silicas are used in combination, it is may be beneficial, although not required, that one of the surface treated silicas be a decyl trimethoxysilane (DTMS) surface treated silica.

In particular embodiments, the silica of the decyl trimethoxysilane (DTMS) surface treated silica may be a fumed silica.

Conventional surface treated silica materials are known and include, for example, TS-530 from Cabosil Corporation, with an 8 nanometer particle size and a surface treatment of hexamethyldisilazane; NAX50, obtained from DeGussa/Nippon Aerosil Corporation, coated with HMDS; H2050EP, obtained from Wacker Chemie, coated with an amino functionalized organopolysiloxane; CAB-O-SIL☐ fumed silicas such as for example TG-709F, TG-308F, TG-810G, TG-811F, TG-822F, TG-824F, TG-826F, TG-828F or TG-829F with a surface area from 105 to 280 m2/g obtained from Cabot Corporation; and the like. Such conventional surface treated silicas are applied to the toner surface for toner flow, triboelectric charge enhancement, admix control, improved development and transfer stability, and higher toner blocking temperature.

In other embodiments, other surface treated silicas can also be used. For example, a silica surface treated with polydimethylsiloxane (PDMS), can also be used. Specific examples of suitable PDMS-surface treated silicas include, for example, but are not limited to, RY50, NY50, RY200, RY200S and R202, all available from Nippon Aerosil, and the like.

In some embodiments, the silica additive is a surface treated silica. When so provided, the surface treated silica may be the only surface treated silica present in the toner composition. As described below, the additive package may also beneficially include large-sized sol-gel silica particles as spacer particles, which is distinguished from the surface treated silica described herein. Alternatively, for example where small amounts of other surface treated silicas are introduced into the toner composition for other purposes, such as to assist toner particle classification and separation, the surface treated silica is the only xerographically active surface treated silica present in the toner composition. Any other incidentally present silica thus does not significantly affect any of the xerographic printing properties. In some embodiments, the surface treated silica is the only surface treated silica present in the additive package applied to the toner composition. Other suitable silica materials are described in, for example, U.S. Pat. No. 6,004,714, the entire disclosure of which is incorporated herein by reference.

In some embodiments, the silica additive may be present in an amount of from about 1 to about 4 percent by weight, based on a weight of the toner particles without the additive (i.e., in an amount of from about 0.5 to about 5 parts by weight additive per 100 parts by weight toner particle). In some embodiments, additives comprise surface-treated silica present in an amount of from about 1.6 weight percent to about 2.8 weight percent based on the weight of the toner particle. In some embodiments, the silica may be present in an amount of from about 1.5 or from about 1.8 to about 2.8 or to about 3 percent by weight.

In some embodiments, the silica has an average particle size of from about 10 to about 60 nm, or from about 15 to about 55 nm, or from about 20 to about 50 nm. In some embodiments, the surface-treated silica has an average particle size of from about 20 to about 50 nm. At values outside the recited amounts and size ranges, developability may worsen, and the toner Q/d characteristics may deteriorate. For example, when the amount of silica is too low, toner becomes too cohesive and may not flow at a sufficient rate; however, when the amount of silica is too high, toner triboelectric charge becomes more sensitive to relative humidity of the ambient atmosphere.

Titania

Another component of the additive package is a titania, and in embodiments a surface treated titania. In some embodiments, the surface treated titania used in embodiments is a hydrophobic surface treated titania.

Conventional surface treated titania materials are known and include, for example, metal oxides such as TiO2, for example MT-3103 from Tayca Corp. with a 16 nanometer particle size and a surface treatment of decylsilane; SMT5103, obtained from Tayca Corporation, comprised of a crystalline titanium dioxide core MT500B coated with DTMS; P-25 from Degussa Chemicals with no surface treatment; an isobutyltrimethoxysilane (i-BTMS) treated hydrophobic titania obtained from Titan Kogyo Kabushiki Kaisha (IK Inabata America Corporation, New York); and the like. Such surface treated titania are applied to the toner surface for improved relative humidity (RH) stability, triboelectric charge control and improved development and transfer stability.

While any of the conventional and available titania materials can be used, it may be beneficial that specific surface treated titania materials be used, which have been found to unexpectedly provide superior performance results in toner compositions. Thus, while any of the surface treated titania may be used in the additive package, in some embodiments the material may be a "large" surface treated titania (i.e., one having an average particle size of from about 30 to about 50 nm, or from about 35 to about 45 nm, particularly about 40 nm). In particular, it has been found that the surface treated titania provides one or more of better cohesion stability of the toners after aging in the toner housing, and higher toner conductivity, which increases the ability of the system to dissipate charge patches on the toner surface.

Specific examples of suitable surface treated titanias include, for example, but are not limited to, an isobutyltrimethoxysilane (i-BTMS) treated hydrophobic titania obtained from Titan Kogyo Kabushiki Kaisha (IK Inabata America Corporation, New York); SMT5103, obtained from Tayca Corporation or Degussa Chemicals, comprised of a crystalline titanium dioxide core MT500B coated with DTMS (decyltrimethoxysilane); and the like. The decyltrimethoxysilane (DTMS) treated titania is particularly beneficial, in some embodiments.

In some embodiments, only one titania, such as surface treated titania, is present in the toner composition. That is, in some embodiments, only one kind of surface treated titania is present, rather than a mixture of two or more different surface treated titanias.

The titania additive may be present in an amount of from about 0.5 to about 4 percent by weight, based on a weight of the toner particles without the additive. In some embodiments, the surface-treated titania may be present in an amount of from about 0.5 weight percent to about 2.5 weight percent based on the weight of the toner particle. In some embodiments, the titania may be present in an amount of from about 0.5 or from about 1.5 to about 2.5 or to about 3 percent by weight. In some embodiments, the surface-treated titania has an average particle size of from In In some embodiments, the titania has an average particle size of from about 10 to about 60 nm, or from about 20 to about 50 nm, such as about 40 nm. At values outside the recited amounts and size ranges, developability may worsen, and the toner Q/d characteristics deteriorate. For example, titania is added to increase uniformity of toner charge distribution at the particle surface, and to compensate the sensitivity of silica to moisture in the atmosphere. However, when the amount of titania is too high, triboelectric charge can be significantly decreased.

Spacer Particles

Another component of the additive package is a spacer particle. In some embodiments, the spacer particles have an average particle size of from about 100 to about 150 nm. In some embodiments, the spacer particles are selected from the group consisting of latex particles, polymer particles, and sol-gel silica particles. In some embodiments, the spacer particle used in embodiments is a sol-gel silica.

Spacer particles, particularly latex or polymer spacer particles, are described in, for example, U.S. Patent Application Publication No. 2004/0137352, the entire disclosure of which is incorporated herein by reference.

In some embodiments, the spacer particles are comprised of latex particles. Any suitable latex particles may be used without limitation. As examples, the latex particles may include rubber, acrylic, styrene acrylic, polyacrylic, fluoride, or polyester latexes. These latexes may be copolymers or crosslinked polymers. Specific examples include acrylic, styrene acrylic and fluoride latexes from Nippon Paint (e.g. FS-101, FS-102, FS-104, FS-201, FS-401, FS-451, FS-501, FS-701, MG-151 and MG-152) with particle diameters in the range from 45 to 550 nm, and glass transition temperatures in the range from about 65° C. to about 102° C.

These latex particles may be derived by any conventional method in the art. Suitable polymerization methods may include, for example, emulsion polymerization, suspension polymerization and dispersion polymerization, each of which is well known to those versed in the art. Depending on the preparation method, the latex particles may have a very narrow size distribution or a broad size distribution. In the latter case, the latex particles prepared may be classified so that the latex particles obtained have the appropriate size to act as spacers as discussed above. Commercially available latex particles from Nippon Paint have very narrow size distributions and do not require post-processing classification (although such is not prohibited if desired).

In a further embodiment, the spacer particles may also comprise polymer particles. Any type of polymer may be used to form the spacer particles of this embodiment. For example, the polymer may be polymethyl methacrylate (PMMA), e.g., 150 nm MP1451 or 300 nm MP116 from Soken Chemical Engineering Co., Ltd. with molecular weights between 500 and 1500K and a glass transition temperature onset at 120° C., fluorinated PMMA, KYNAR®(polyvinylidene fluoride), e.g., 300 nm from Pennwalt, polytetrafluoroethylene (PTFE), e.g., 300 nm L2 from Daikin, or melamine, e.g., 300 nm EPOSTAR-S® from Nippon Shokubai.

In some embodiments, the spacer particles on the surfaces of the toner particles are believed to function to reduce toner cohesion, stabilize the toner transfer efficiency and reduce/minimize development falloff characteristics associated with toner aging such as, for example, triboelectric charging characteristics and charge through. These additive particles function as spacers between the toner particles and carrier particles and hence reduce the impaction of smaller conventional toner external surface additives, such as the above-described silica and titania, during aging in the development housing. The spacers thus stabilize developers against disadvantageous burial of conventional smaller sized toner additives by the development housing during the imaging process in the development system. The spacer particles function as a spacer-type barrier, and therefore the smaller toner additives are shielded from contact forces that have a tendency to embed them in the surface of the toner particles. The spacer particles thus provide a barrier and reduce the burial of smaller sized toner external surface additives, thereby rendering a developer with improved flow stability and hence excellent development and transfer stability during copying/printing in xerographic imaging processes. The toner compositions of the present disclosure thereby exhibit an improved ability to maintain their DMA (developed mass per area on a photoreceptor), their TMA (transferred mass per area from a photoreceptor) and acceptable triboelectric charging characteristics and admix performance for an extended number of imaging cycles.

The spacer particles may be present in an amount of from about 0.3 to about 2.5 percent by weight, based on a weight of the toner particles without the additive. In some embodiments, the spacer particles are present in an amount of from about 0.6 weight percent to about 1.8 weight percent based on the weight of the toner particle. In some embodiments, the spacer particles may be present in an amount of from about 0.5 or from about 0.6 to about 1.8 or to about 2.0 percent by weight.

In some embodiments, the spacer particles are large sized silica particles. Thus, in some embodiments, the spacer particles have an average particle size greater than an average particles size of the silica and titania materials, discussed above. For example, the spacer particles in this embodiment are sol-gel silicas. Examples of such sol-gel silicas include, for example, X24, a 150 nm sol-gel silica surface treated with hexamethyldisilazane, available from Shin-Etsu Chemical Co., Ltd. In some embodiments, the spacer particles may have an average particle size of from about 60 to about 300 nm, or from about 75 to about 205 nm, such as from about 100 nm to about 150 nm. At values outside these amount and size ranges, developability worsens, and the toner Q/d characteristics become undesirable. For example, the spacer particles decrease adhesion of toner particles to surfaces in the system (such as donor roll, photoreceptor, etc.) and thus to increase developability and transfer efficiency, and to prevent toner filming. However, if the amount of spacer is too high, it can significantly decrease both toner charge and its ability to flow.

In embodiments, there are provided methods of making a support toner material comprising blending polyvinyl alcohol with blend additives comprising a chitosan and polyvinylpyrrolidone and forming support toner particles after the blending step.

In embodiments, methods may further comprise blending surface additives with the support toner particles.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This prophetic Example shows literature data (Mudigoudra B. S., et al., *Res. J. Recent Sci. Vol.* 1(9), 83-86) indicating the ability to modulate/tune PVA/PVP blends with varied amounts of chitosan. Table 1 below shows the $T_g$, $T_m$ and $T_d$ of PVA/PVP blend filled with varying weight percentage of chitosan.

TABLE 1

| Chitosan (wt %) | $T_g$ (° C.) | $T_m$ (° C.) | $T_d$ (° C.) |
| --- | --- | --- | --- |
| 0.4 | 86.9 | 328.02 | 438.4 |
| 1.2 | 90.43 | 331.51 | 438.5 |
| 2 | 104.05 | 325.2 | 441.05 |
| 6 | 112.29 | 328.02 | 438.4 |
| 12 | 98.52 | 334.85 | 441.59 |

$T_g$ - glass transition temperature; $T_m$ - melting temperature; $T_d$ - dissociation temperature $T_g$—glass transition temperature; $T_m$—melting temperature; $T_d$—dissociation temperature In the practice of various embodiments herein, this tuning of the melt properties will allow matching of the support material with the build material.

Example 2

This prophetic Example describes the preparation of polyvinylalcohol (PVA) based toners for use in additive manufacturing via xerographic printing.

STEP 1 (mixing components to create blends): PVA, polyvinylpyrrolidone and chitosan are mixed together to create homogenous blends. Mixing can be performed in a melt extruder. Alternatively, the components are first dissolved in water and mixed together followed by precipitation into a non-solvent such as ethanol or acetone. The dried precipitated polymer is melt extruded with additional components such as charge control agents, pigments to enable IR heating, and the like to yield a homogenously blended extrudate.

STEP 2 (making toner particle): The extrudate is pulverized in a jet mill and classified to yield toner particles.

STEP 3 (additive blending): Toner particles are blended with surface additives like $SiO_2$, $TiO_2$ to optimize charge and flow. Resins which show moisture affinity suffer from low charging especially under A zone conditions (80% Relative Humidity, 80° F.). Optionally, the toner surface can be coated with a hydrophobic silicone oil layer. Silicone oils as surface additive can reduce toner's humidity sensitivity.

What is claimed is:

1. A support material toner particle for use in xerographic additive manufacturing comprising:
   a polyvinyl alcohol (PVA) polymer; and
   blend-additives comprising:
      a chitosan; and
      a polyvinylpyrrolidone (PVP),
      wherein the amount of blend-additives is selected to adjust the $T_g$ of the PVA polymer to be within about 1° C. to about 20° C. of a desired build material toner $T_g$ and further wherein the chitosan has a number average molecular weight from about 100,000 Daltons to about 1,000,000 Daltons.

2. The support material toner particle of claim 1, wherein the amount of blend-additives is selected to adjust the $T_g$ of the PVA polymer to be within about 1° C. to about 10° C. of a desired build material toner $T_g$.

3. The support material toner particle of claim 1, further comprising toner surface additives.

4. The support material toner particle of claim 3, wherein the toner surface additives comprise one or more of a silica, a titania, a silicone oil, or a charge control agent.

5. The support material toner particle of claim 1, wherein the blend-additives further comprise a wax.

6. The support material toner particle of claim 1, wherein the blend additives further comprise a colorant.

7. The support material toner particle of claim 1, wherein the PVP has a number average molecular weight from about 1,000 Daltons to about 500,000 Daltons.

8. A xerographic toner system comprising:
a build toner material; and
a support toner material;
wherein the support toner material comprises:
a polyvinyl alcohol (PVA) polymer; and
blend-additives comprising:
a chitosan; and
a polyvinylpyrrolidone (PVP),
wherein the amount of blend-additives is selected to adjust the $T_g$ of the PVA polymer to be within about 1° C. to about 20° C. of the build toner material $T_g$.

9. The xerographic toner system of claim 8, wherein the amount of blend-additives is selected to adjust the $T_g$ of the PVA polymer to be within about 1° C. to about 10° C. of the build toner material $T_g$.

10. The xerographic toner system of claim 8, wherein the build material comprises acrylonitrile butadiene styrene (ABS).

11. The xerographic toner system of claim 10, wherein the ABS has a $T_g$ of about 100 to about 130° C.

12. The xerographic toner system of claim 8, wherein the build material comprises a nylon polyester.

13. The xerographic toner system of claim 12, wherein the nylon polyester has a $T_g$ of about 80 to about 110° C.

14. The xerographic toner system of claim 8, wherein the support toner material further comprises surface additives.

15. The xerographic toner system of claim 14, wherein the surface additives comprise one or more of a silica, a titania, a silicone oil, or a charge control agent.

16. The xerographic toner system of claim 8, wherein the blend additives further comprise a colorant.

17. A method of making a support toner material comprising:
blending polyvinyl alcohol with blend additives comprising a chitosan and polyvinylpyrrolidone; and
forming support toner particles after the blending step, wherein the polyvinylpyrrolidone has a number average molecular weight from about 1,000 Daltons to about 500,000 Daltons.

18. The method of claim 17, further comprising blending surface additives with the support toner particles.

19. The method of claim 17, wherein the amount of blend additives is selected to adjust the $T_g$ of the PVA polymer to be within about 1° C. to about 20° C. of a build material toner $T_g$ with which it will be used.

* * * * *